United States Patent [19]

Petrinjak et al.

[11] Patent Number: 5,598,511
[45] Date of Patent: Jan. 28, 1997

[54] METHOD AND APPARATUS FOR INTERPRETING DATA AND ACCESSING ON-LINE DOCUMENTATION IN A COMPUTER SYSTEM

[75] Inventors: Jan S. Petrinjak, Phoenix; Terri L. Corbett, Chandler; Erik O. Berg, Phoenix; Judy Aguiar, Chandler, all of Ariz.

[73] Assignee: Intel Corporation, Santa Clara, Calif.

[21] Appl. No.: 999,279

[22] Filed: Dec. 28, 1992

[51] Int. Cl.$^6$ .................................................. G06F 15/18
[52] U.S. Cl. ................................................ 395/54; 395/50
[58] Field of Search ................................. 395/50, 51, 54, 395/77, 53

[56] References Cited

U.S. PATENT DOCUMENTS

| | | | |
|---|---|---|---|
| 3,882,305 | 5/1975 | Johnstone | 235/151.11 |
| 3,902,051 | 8/1975 | Betten | 235/150.1 |
| 4,155,116 | 5/1979 | Tawfik et al. | 364/119 |
| 4,593,367 | 6/1986 | Slack et al. | 364/513 |
| 4,599,692 | 7/1986 | Tan et al. | 364/513 |
| 4,599,693 | 7/1986 | Denenberg | 364/513 |
| 4,620,286 | 10/1986 | Smith et al. | 364/513 |
| 4,642,782 | 2/1987 | Kemper et al. | 364/550 |
| 4,644,479 | 2/1987 | Kemper et al. | 364/550 |
| 4,649,515 | 3/1987 | Thompson et al. | 364/900 |
| 4,658,370 | 4/1987 | Erman et al. | 395/54 |
| 4,675,829 | 6/1987 | Clemenson | 364/513 |
| 4,697,243 | 9/1987 | Moore et al. | 364/513 |
| 4,704,695 | 11/1987 | Kimura et al. | 364/513 |
| 4,713,775 | 12/1987 | Scott et al. | 395/50 |
| 4,752,889 | 6/1988 | Rappaport et al. | 364/513 |
| 4,783,752 | 11/1988 | Kaplan et al. | 395/64 |
| 4,839,823 | 6/1989 | Matsumoto | 364/513 |
| 4,847,784 | 7/1989 | Clancey | 364/513 |
| 4,918,620 | 4/1990 | Ulug | 395/75 |
| 5,014,220 | 5/1991 | McMann et al. | 364/513 |
| 5,016,204 | 5/1991 | Simoudis et al. | 395/53 |
| 5,043,915 | 8/1991 | Suwa et al. | |
| 5,101,362 | 3/1992 | Simoudis | 395/53 |
| 5,103,498 | 4/1992 | Lonier et al. | 395/68 |
| 5,167,012 | 11/1992 | Hayes et al. | 395/76 |
| 5,225,978 | 7/1993 | Petersen et al. | 395/51 |
| 5,239,487 | 8/1993 | Horejsi et al. | 395/916 |
| 5,239,617 | 8/1993 | Garder et al. | 395/50 |
| 5,261,086 | 11/1993 | Shiramizu | 395/54 |
| 5,333,237 | 7/1994 | Stefanopoulos et al. | 395/50 |
| 5,355,444 | 10/1994 | Chirico | 395/50 |

FOREIGN PATENT DOCUMENTS 63-47839  2/1988  Japan .

OTHER PUBLICATIONS

Pan et al, "Preliminary Development of a Knowledge–based System for Building Configuration", Computer Aided Egineering Journal, vol. 8 Iss 1 pp. 6–12 Feb. 1991.

Simpson et al, "Pointer—An Intelligent Maintenance Aid", Autotest Con '89 Conference Record: The Systems Readiness Technology Conference: Automatic Testing in the 21st Century, pp. 26–31 Sep. 25–28 1989.

*Primary Examiner*—Robert W. Downs
*Attorney, Agent, or Firm*—Blakely, Sokoloff, Taylor & Zafman

[57] ABSTRACT

A modular expert system that uses knowledge modules from multiple personal computer applications to solve a problem. The expert system accesses additional knowledge modules from independent computer applications to reach a conclusion regarding a computer system or application problem. A learning module records past problem-solving histories for reference by the expert system in enhancing problem solving capabilities. A knowledge acquisition module allows an application developer to create knowledge modules for new applications to be used with the modular expert system. A method for solving problems using modular knowledge modules from multiple applications is also described. The method compares a list of facts to rules in its current knowledge base. If a valid conclusion can not be reached then another knowledge module is selected by an inference engine to replace the existing knowledge module to provide further knowledge in solving the problem.

13 Claims, 5 Drawing Sheets

METHOD AND APPARATUS FOR INTERPRETING DATA AND ACCESSING ON-LINE DOCUMENTATION IN A COMPUTER SYSTEM

BACKGROUND OF THE INVENTION

1. Field of the Invention

The present invention relates generally to the field of expert computer systems and more specifically to a modular method and apparatus for interpreting data from multiple computer applications and accessing relevant on-line documentation to assist a computer user in solving an application problem.

2. Prior Art

An expert system is typically defined to be a computing system that embodies organized knowledge concerning some specific area of human expertise, sufficient to perform as a skillful consultant. Expert systems that have specialized problem-solving expertise are commonly used to solve problems in applications such as circuit layout, logic design, interpreting data, and diagnosing malfunctions.

Typical expert systems are designed to solve only one type of problem. For example, one expert system may be specifically designed to solve problems dealing with diagnosing medical illnesses; another expert system may be specifically designed to reach conclusions about the outcome of an election based on statistical survey data. However, neither of these two specifically designed expert systems is capable of solving a different type of problem than that for which it is specifically designed.

Today's personal computers run a wide variety of software applications that generate the type of information that is readily processed by an expert system. For example, a typical computer network program logs data about the frequency of occurrence of a variety of events on the network; a typical system monitor program logs information about the frequency of accesses to various components in the computer system; a user-application such as a word processor may log problems encountered by the user. In such a computer system, information from each of the individual applications may be needed to solve a given system or application problem encountered by a computer user.

Therefore, a modular expert system that is capable of understanding and analyzing the wide variety of data produced by individual personal computer applications is needed.

SUMMARY OF THE INVENTION

The present invention provides a method and apparatus for assisting a computer user in solving computer system and application problems. The present invention includes a working memory, a modular knowledge base, and an inference engine. The working memory stores a list of facts about a current problem. The modular knowledge base has rules corresponding to meta knowledge, general knowledge, and at least one knowledge module from an application. The inference engine interprets the facts in the working memory by applying the facts to the rules in the knowledge base to produce a valid conclusion about the problem.

One object of the present invention is to provide a modular expert system capable of invoking knowledge modules from multiple applications in order to arrive at a valid conclusion for a given problem.

Another object of the present invention is to provide an expert system that can be run in a simulation mode to allow the computer user to input the list of facts into the working memory.

Another object of the present invention is to provide an expert system with a learning module to record the facts, results, and conclusions for each problem solved. These records are then usable by the expert system as an extension of the knowledge base to enhance problem solving capabilities.

Another object of the present invention is to provide an expert system that accesses relevant on-line documentation from individual computer applications to assist the user in solving a problem.

DETAILED DESCRIPTION OF THE PREFERRED EMBODIMENT

A method and apparatus for assisting a computer user in solving application and computer system problems is described. In the following description, numerous specific details are set forth, such as specific computer applications and configurations, in order to provide a thorough understanding of the present invention. It will be apparent, however, to one skilled in the art that the present invention may be practiced without these specific details. In other instances, well-known methods and apparatus are not described in detail in order not to obscure the present invention.

Examples of expert systems are found in the following U.S. patents which are hereby incorporated by reference: U.S. Pat. No. 5,01 4,220 issued to McMann et al., U.S. Pat. No. 3,882,305 issued to Johnstone, U.S. Pat. No. 3,902,051 issued to Betten, U.S. Pat. No. 4,155,116 issued to Tawfik et al., U.S. Pat. No. 4,593,367 issued to Slack et al., U.S. Pat. No. 4,599,692 issued to Tan et al., U.S. Pat. No. 4,599,693 issued to Denenberg, U.S. Pat. No. 4,620,286 issued to Smith et al., U.S. Pat. No. 4,642,782 issued to Kemper et al., U.S. Pat. No. 4,644,479 issued to Kemper et al., U.S. Pat. No. 4,649,515 issued to Thompson et al., U.S. Pat. No. 4,675,829 issued to Clemenson, U.S. Pat. No. 4,697,243 issued to Moore et al., U.S. Pat. No. 4,704,695 issued to Kimura et al., U.S. Pat. No. 4,713,775 issued to Scott et al., U.S. Pat. No. 4,752,889 issued to Rapaport et al., U.S. Pat. No. 4,839,823 issued to Matsumoto, and U.S. Pat. No. 4,847,784 issued to Clancey.

Traditional expert systems fail to adequately address the needs of today's personal computers and their applications. The present invention is an expert system that addresses the following demands of personal computer systems and applications:

Complex Data

Many personal computer applications provide large quantities of information on a variety of subjects. For example, network applications commonly report statistics on the frequency of data exchange, time and frequency of individual computer failure, and frequency of network failure, etc. Other applications report statistics on frequency of accesses to individual computer components such as disk drives, memory, etc. In addition, applications often provide statistics on problems encountered by the application user.

Although many computer applications provide data on a variety of subjects, very few applications tell the user how to use the information provided. Consequently, such programs are usable by only a few experts that are able to interpret the data. The present invention acts as an on-line expert to interpret information provided by individual applications and display the results in an easy-to-understand format usable by all levels of computer users.

Complex Documentation

Another problem for personal computer systems is accessibility to technical documentation. Technical documentation is typically provided with a computer system and the individual applications for the system. However, locating the needed sections of cumbersome technical and troubleshooting documents is often time-consuming for both expert and novice users. The present invention acts as an on-line technical researcher that locates and displays the files relating to problems encountered in the current application. This additional information guides the user toward solving computer system or application problems and helps the user make the most use of the information provided by each of the parent applications.

Multiple Applications

Today's personal computers run multiple applications concurrently. As a result, more than one application may contribute to or provide knowledge about the solution to a given problem. Traditional expert systems are only capable of using knowledge from a single application to solve a problem; they have no flexibility to utilize knowledge from other applications. Therefore, traditional expert systems fail to adequately solve problems that require knowledge from more than one application.

The present invention provides an expert system that is modular; it is independent of the current parent application and can access knowledge from all applications for which it provides problem-solving capabilities in solving a problem.

The present invention enhances any software application that contains large files of on-line documentation, graphics, or multimedia. The present invention is particularly suited for use with applications that contain large or complex amounts of statistical information, such as monitoring, analyzing, or troubleshooting applications. The present invention assists the user by interpreting data from application programs and providing quick and easy access to the relevant on-line documentation.

Figure 1:
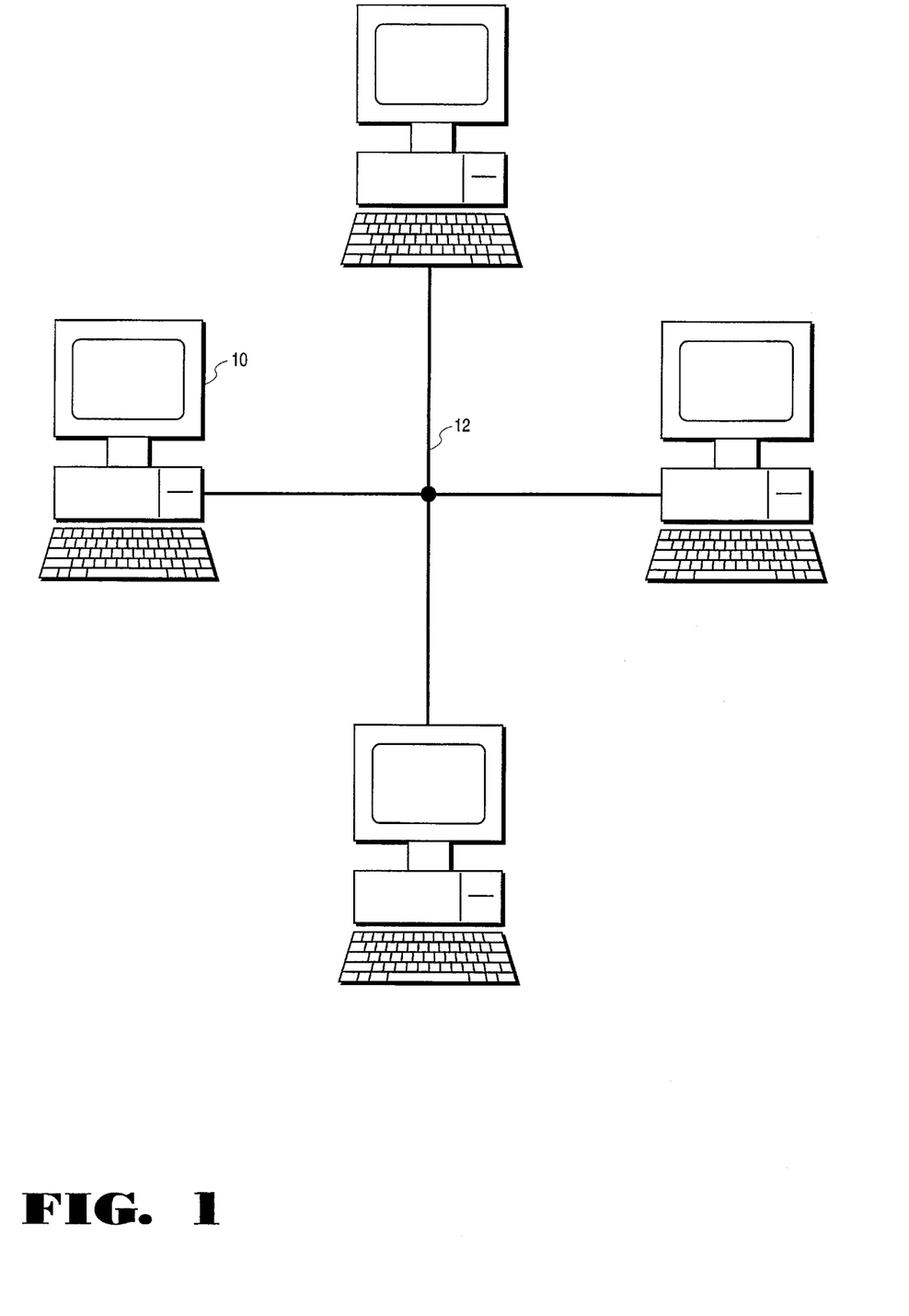
FIG. 1 is a diagram of a computer network.

FIG. 1 is a diagram of a computer network showing computers 10 connected by network 12. A network connection of computers is commonly used to allow the computers to exchange information. The present invention is suited for assisting a computer user in solving problems on individual computer systems as well as computers connected in a network.

Figure 2:
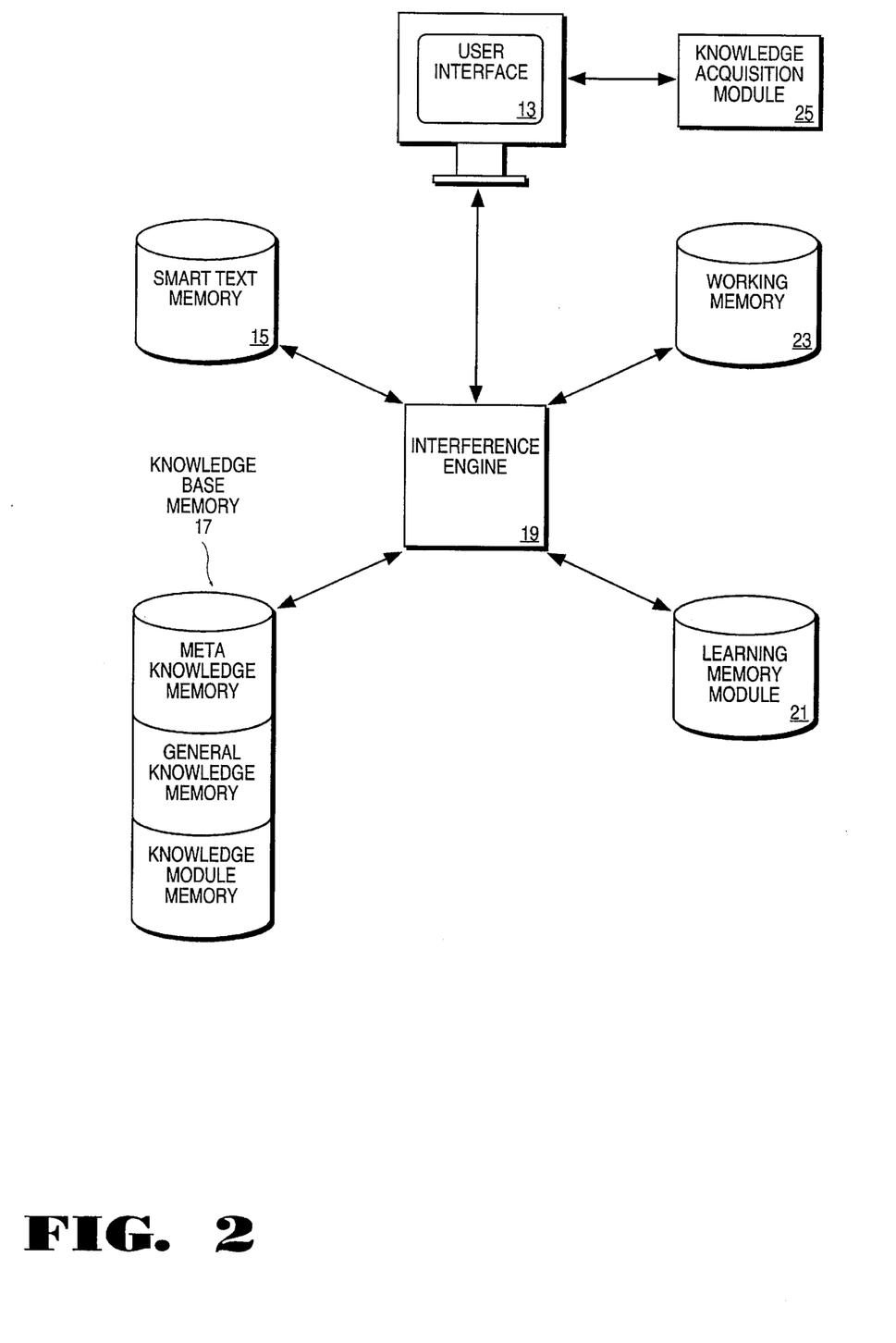
FIG. 2 is a block diagram showing an embodiment of the present invention in a computer system.

FIG. 2 is a block diagram showing an embodiment of the present invention in a computer system. User Interface 13 is a computer video screen that displays information for the computer user. Inference Engine 19 logically analyzes a list of facts stored in Working Memory 23 according to rules contained in Knowledge Base Memory 17 to solve a current computer system or application problem. Knowledge Base Memory 17 contains rules comprising meta knowledge, general knowledge and an application-specific knowledge module. Learning Module Memory 21 contains facts and results of previously solved problems. Inference Engine 19 accesses Learning Module Memory 21 for any relevant information about a current problem. When a valid conclusion is reached about a current problem, Inference Engine 19 stores the facts and corresponding results and conclusions in Learning Module Memory 21 for future use. After reaching a valid conclusion about a problem, Inference Engine 19 accesses Smart Text Memory 15 to provide the user with on-line documentation relevant to solving the problem. The on-line documentation stored in Smart Text Memory 15 is in the form of hypertext, which may include text, graphics, and multimedia images. Knowledge Acquisition Module 25 is an interactive tool that allows an application developer to create new knowledge modules for applications.

Figure 3:
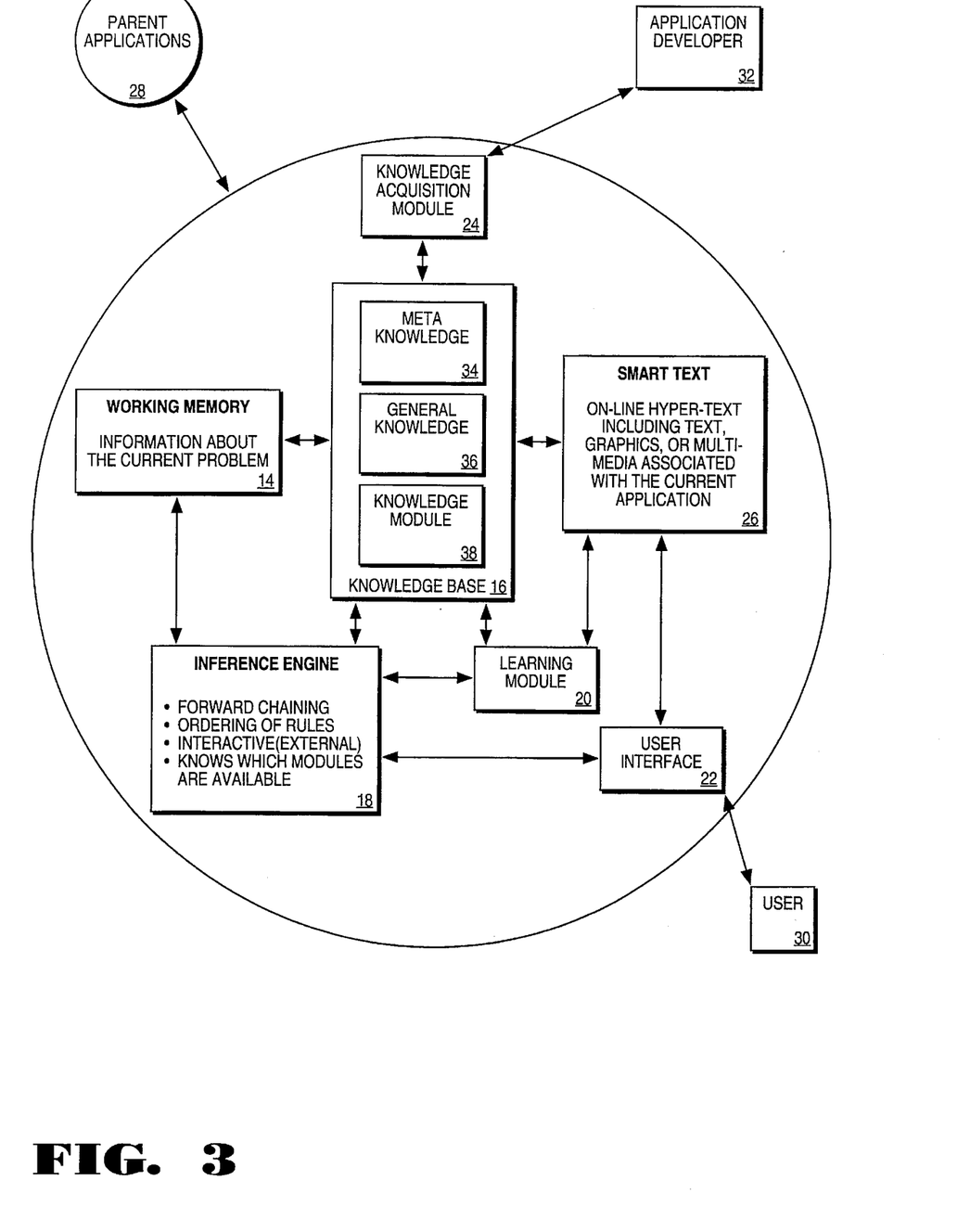
FIG. 3 is a block diagram of the preferred embodiment of the present invention.

FIG. 3 is a block diagram of the preferred embodiment of the present invention. The following section describes each component in detail. Working Memory 14 receives a list of starting facts about a current problem either from Parent Application 28 or User 30 via User Interface 22. Knowledge Base 16 contains rules, results, and conclusions that correspond to Meta Knowledge 34, General Knowledge 36, and an application-specific Knowledge Module 38. Inference Engine 18 analyzes the list of facts in Working Memory 14 according to the rules in Knowledge Base 16 in order to reach one of the conclusions in Knowledge Base 16. Intermediate results of Inference Engine 18 are stored in Working Memory 14 for further analysis. Facts and corresponding results or conclusions reached by Inference Engine 18 during analysis are stored in Learning Module 20 for subsequent use by Inference Engine 18 in solving future problems. A valid conclusion in Knowledge Base 16 indexes Smart Text 26 to provide User 30 via User Interface 22 with on-line documentation relevant to solving the problem. Knowledge Acquisition Module 24 is an interactive tool that allows Application Developer 32 to create independent Knowledge Modules 38 for applications.

Knowledge Base 16 contains the problem solving knowledge (coded as a set of logical rules such as "If A AND B, THEN C") that Inference Engine 18 uses to interpret the facts in Working Memory 14. Knowledge Base 16 stores Meta Knowledge 34, General Knowledge 36, and a Knowledge Module 38. Meta Knowledge 34 comprises basic rules of logic for allowing Inference Engine 18 to understand logical statements. General Knowledge 36 comprises rules corresponding to the computer system on which the present invention is used. Both Meta Knowledge 34 and General Knowledge 36 are application-independent. Knowledge Module 38 comprises application-specific rules for the current application. Each application that uses the present invention to solve problems has an associated set of application-specific rules contained in a knowledge module specific to that application.

When the present invention uses an application to solve a problem, that application's knowledge module is loaded into Knowledge Base 16 to provide application-specific rules. If the present invention needs to access another application's knowledge to solve the current problem, the current knowledge module is removed and the knowledge module for the new application is loaded into Knowledge Base 16. When advancing to a new knowledge module, the present invention uses Working Memory 14 to retain any information learned through the previous knowledge module.

Inference Engine 18 is an analytical engine that uses the rules in Knowledge Base 16 to interpret the information stored in Working Memory 14. In the preferred embodiment, Inference Engine 18 analyzes information in a "forward reasoning" style in which the engine chains forward from the observed conditions (e.g., the starting facts placed in the Working Memory from the parent application or entered by the user) toward a conclusion.

Inference Engine 18 operates in cycles. Initially, the parent application loads Working Memory 14 with available information. In each cycle, Inference Engine 18 matches the contents of Working Memory 14 against the conditional statement (left-hand side) of each rule in Knowledge Base 16. If the contents of Working Memory 14 match the left-hand side of a rule, that rule's activation flag is set to "active." The Inference Engine places all activated rules on an agenda.

Inference Engine 18 selects rules from the agenda and places the contents of the right-hand side of the rule in Working Memory 14. This new information in Working Memory 14 may cause Inference Engine 18 to place other rules on the agenda during future cycles. Inference Engine 18 continues running cycles until it reaches a valid conclusion or determines that additional knowledge from another application or the user is required.

Learning Module 20 keeps a log of information, facts, results, and conclusions that the present invention encounters while solving problems. Learning Module 20 derives patterns and trends from the accumulated data which are applied in solving future problems. Each time Inference Engine 18 solves a specific problem, Learning Module 20 stores the starting information and the valid conclusion as an entry in a problem log. The present invention gives User 30 the option of adding additional notes or comments about the problem to the problem entry.

While analyzing a problem, Inference Engine 18 checks the contents of the problem log for entries matching the current situation. If a matching entry is found, Inference Engine 18 uses the additional information in solving the current problem and the user notes are displayed on the computer screen. In addition, Learning Module 20 checks the problem logs for patterns and trends that allow the present invention's performance to improve with experience and adapt to change. Users can transport problem logs between individual embodiments of the present invention and modify log entries to fine tune the present invention for local conditions.

User Interface 22 is a display window on the computer that allows User 30 to configure parameters, enter starting information, and view final results. User Interface 22 can be customized for different applications, but always contains an area to specify and view starting information and an area to view final results and any multimedia, text, or graphics associated with the result. User Interface 22 also includes reporting capabilities, a user notepad, and on-line help features.

Knowledge Acquisition Module 24 is an interactive tool that allows Application Developer 32 to create independent Knowledge Modules 38 for applications. Initially, Knowledge Acquisition Module 24 queries Application Developer 32 for a list of checklist questions pertinent to a given problem to be solved. Knowledge Acquisition Module 24 then queries Application Developer 32 for the relationships between the checklist questions and results and determines which results are valid conclusions. Knowledge Acquisition Module 24 checks for logical consistency between the relationships and conclusions and creates a set of corresponding logical rules. Knowledge Acquisition Module 24 stores the rules, results, and valid conclusions in a new Knowledge Module 38 for the application.

Figure 4:
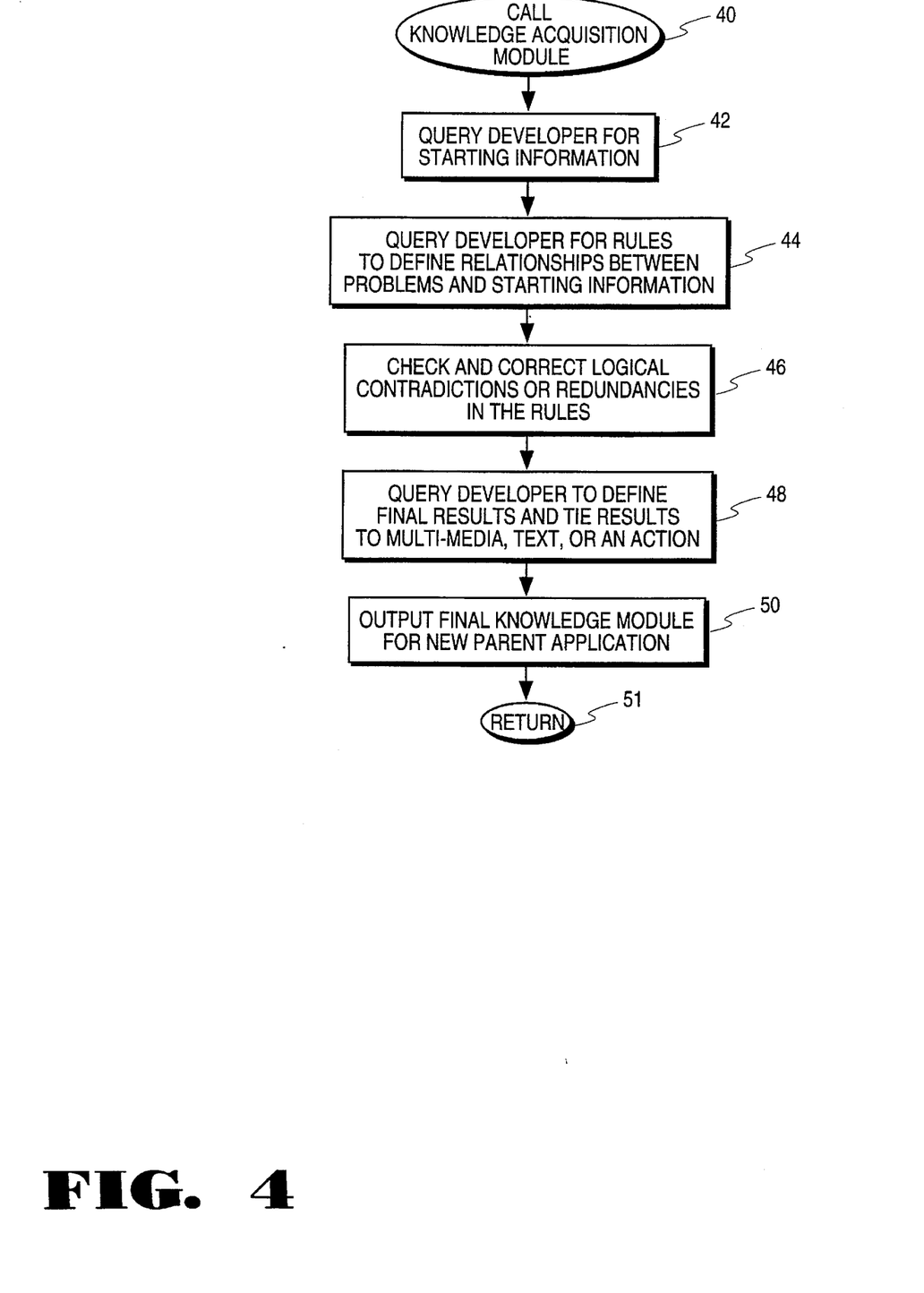
FIG. 4 is a flow chart of the method used by the knowledge acquisition module of the present invention to create a knowledge module.

FIG. 4 illustrates in flow chart form the method used by the Knowledge Acquisition Module of the present invention to develop a new set of application-specific rules for a new knowledge module.

The process begins in Step 40 when the present invention calls the Knowledge Acquisition Module in response to a request by the user.

In Step 42, the Knowledge Acquisition Module queries the Application Developer for starting information. The starting information comprises checklist questions. The answers to the checklist questions are the list of facts that the present invention obtains from the parent application or user when solving a problem. The Knowledge Acquisition Module queries the developer for the format of the information, the range of possible values (if any), and the location of the information in the Parent Application's code.

In Step 44, the Knowledge Acquisition Module queries the developer about the relationships (rules) between the facts in the starting information. These rules between facts in the starting information may point to the following: 1) additional facts (i.e., query the user or parent application for more information), 2) additional rules (i.e., check for other relationships in the starting information), 3) a final result or conclusion, or 4) additional facts from another application. The Knowledge Acquisition Module continues querying the developer until all rules have been traced to a result.

In Step 46, the Knowledge Acquisition Module checks the logical relationships defined in Step 44 for contradicting or redundant rules and for circular logic. The user is allowed to change the rules to correct any logical deficiencies.

In Step 48, the Knowledge Acquisition Module asks the developer to define the action to be taken for each final result. The developer can associate a specific final result with a particular graphic, multimedia display, or passage in a body of on-line documentation. A specific final result can also lead to a query for information or prompt the present invention to load another application's knowledge module.

In Step 50, the method is completed by producing a new knowledge module for the new parent application.

Figure 5:
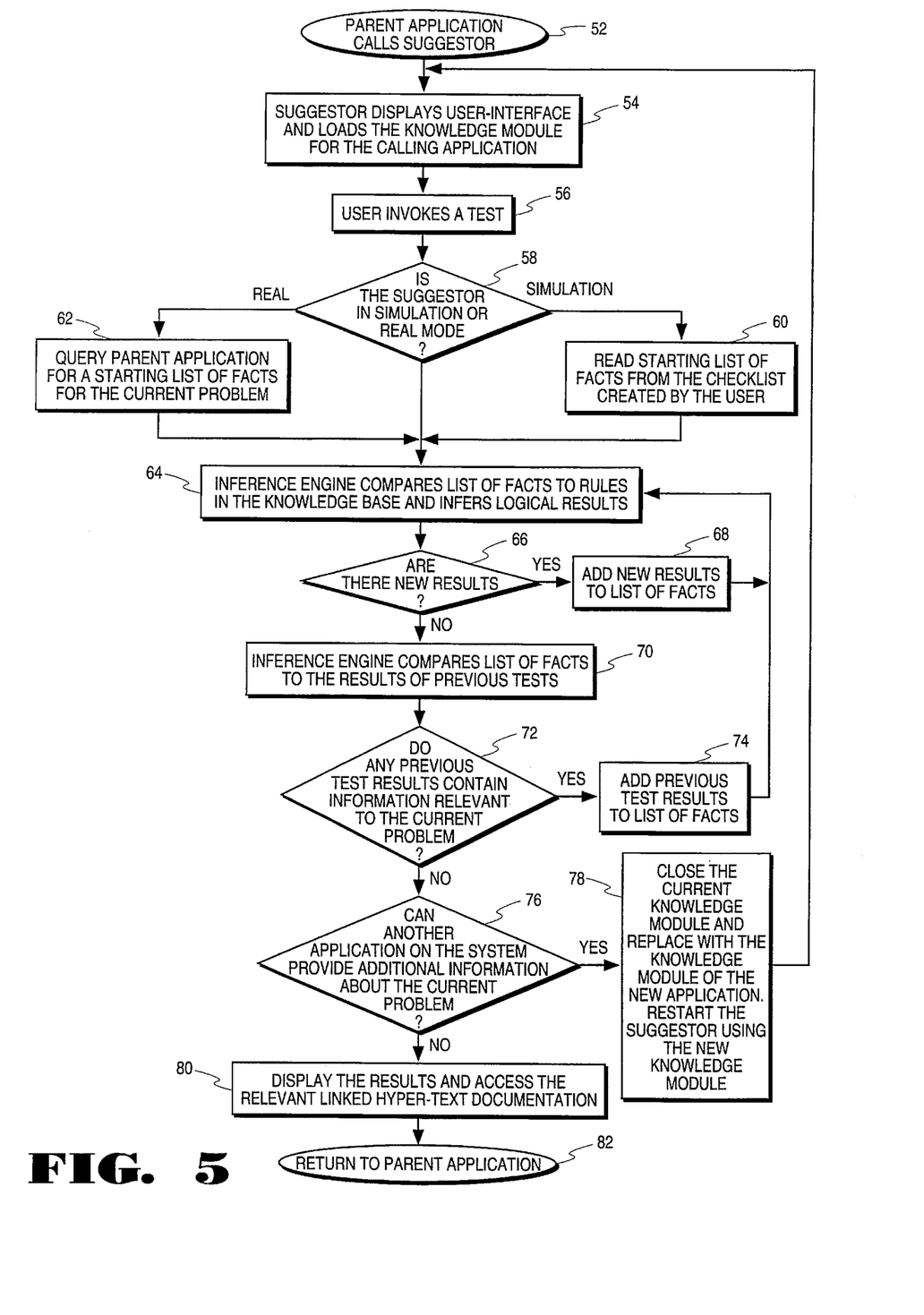
FIG. 5 is a flow chart of the method of the present invention for gathering and interpreting information.

FIG. 5 illustrates in flow chart form the method of the present invention for obtaining and interpreting information from a parent application to assist the user in solving a problem.

The process begins in Step 52 when the parent application calls the present invention, hereafter also known as the Suggestor. This call is usually in response to the user selecting the Suggestor option from within a parent program.

In Step 54, the Suggestor user interface window is displayed on the computer screen and becomes the primary window. The parent application remains active and running in the background. The Suggestor also loads the Knowledge Module rules and checklist parameter values associated with the calling (parent) application.

In Step 56, the user invokes a test by selecting a 'Run Test' option from the user interface.

In Step 58, the Suggestor determines if the user has selected real or simulation mode in the user interface. If the user configures the Suggestor for simulation mode, the Suggestor proceeds with Step 60; otherwise, the Suggestor skips to Step 62.

In Step 60, the Suggestor is operating in simulation mode and all starting information about the current problem is read from the Suggestor's user interface. Simulation mode allows the user to create custom-made problems for the Suggestor for simulation training purposes or debugging the rules in the Knowledge Base. After completing Step 60, the Suggestor skips to Step 64.

In Step 62, the Suggestor is operating in real mode. The Suggestor establishes a link with the parent application and queries the parent application for a list of facts about the current problem. The list of facts are stored in the working memory.

In Step 64, the inference engine analyzes the facts received in Step 60 or Step 62. The Inference Engine analyzes the list of facts according to a series of logical statements (i.e., the rules) in the current knowledge base to determine a set of results. Each logical statement (or rule) represents a step toward one of the possible final conclusions.

In Step 66, the inference engine determines if any new results were obtained in Step 64. If there are new results, the Suggestor proceeds with Step 68; otherwise, the Suggestor skips to Step 70.

In Step 68, the new results from Step 64 are added to the list of facts. The Suggestor then skips to Step 64 for further analysis.

In Step 70, the Inference Engine compares the current list of facts to the facts and results of previous tests stored in the Learning Module.

In Step 72, the Suggestor determines if previous test results in the Learning Module contain information relevant to the current problem. If so, the Suggestor proceeds to Step 74; otherwise, it skips to Step 76.

In Step 74, the results of the previous tests determined to be relevant to the current problem are added to the list of facts for the current problem. The Suggestor then skips to Step 64 for further analysis of the list of facts.

In Step 76, when the Suggestor has exhausted the execution of rules in a particular Knowledge Module without a satisfactory result, the Inference Engine consults its directory to see if a Knowledge Module of another application may be able to provide an answer. If the Suggestor detects a suitable application, the Suggestor proceeds to Step 78; otherwise the Suggestor skips to Step 80.

In Step 78, the user is prompted to activate the new application identified in Step 76. After the user confirms, the Suggestor activates the new application and loads the new application's Knowledge Module. The Suggestor then skips to Step 54 to analyze the current problem using the knowledge from the new application.

In Step 80, the Suggestor has reached a valid conclusion and displays the results in the user interface window. In addition, the Suggestor uses the starting information and the results to reference a large body of on-line documentation and provide the user with information relevant to the current problem. The on-line documentation is in the form of hypertext, which may include text, graphics, and multimedia images. The Learning Module creates an entry in the problem log and allows the user to add any comments about the current problem or its solution.

The process is completed in Step 82 by returning to the parent application.

EXAMPLE

The following example is illustrative only and does not in any way limit the scope of the present invention. It is understood that a typical rules base comprises hundreds of rules and handles dozens of questions as inputs.

Problem

Using an electronic mail application, the user of computer A tries to send information X found on computer A's hard disk drive to computer B over a network. Computer B fails to receive the information. Determine why computer B did not receive information X.

User invokes the present invention, or Suggestor, to aid in solving the problem. The Suggestor displays the user-interface and loads the knowledge module for the electronic mail application. The electronic mail application's knowledge module contains the following questions and rules:

Electronic Mail Application Knowledge Module
Questions:
  1. Did the user send the information?
Rules:
  1. If the user sent the information, then call the system monitor application's knowledge module for information on system functionality; otherwise, report to the user that "The problem is that the message was not sent, Send again."

The Suggestor queries the electronic mail application for answers to the questions in its knowledge module. These answers are the starting facts. The electronic mail application checks its user activity log and returns the answers as follows: 1) yes.

The inference engine applies these starting facts to the rules in the electronic mail application's knowledge module as follows. Rule 1: The user sent the information; therefore, call the system monitor application's knowledge module.

The Suggestor loads the knowledge module for the system monitor application. The system monitor application's knowledge module contains the following questions and rules:

System Monitor Application Knowledge Module
Questions:
  1. Is the hard drive functioning correctly?
Rules:
1. If the hard drive is functioning correctly, then call the network application's knowledge module to obtain information about the functionality of the network; otherwise, report to the user that "The hard drive in computer A is malfunctioning."

The Suggestor queries the system monitor application for answers to the questions in its knowledge module. These answers are added to the list of starting facts. The system monitor application performs tests on the hard drive and returns the answers as follows: 1) yes.

The inference engine applies the list of starting facts to the rules in the electronic mail application's knowledge module as follows. Rule 1: The hard disk drive is functioning properly; therefore, call the network application's knowledge module.

The Suggestor loads the knowledge module for the network application. The network application's knowledge module contains the following questions and rules:

Network Application Knowledge Module
Questions:
  1. Is the network functioning properly?
  2. Is computer A communicating with the network?
  3. Is computer B communicating with the network?
Rules:
  1. If the network is functioning properly, then go to rule 2; otherwise, report to the user that "There is a general network failure."
  2. If computer A is communicating with the network, then go to rule 3; otherwise, report to the user that "Computer A is not properly connected to the network."

3. If computer B is communicating with the network, then report to the user that "The network is functioning properly and computers A and B are properly connected to the network;" otherwise, report to the user that "Computer B is not properly connected to the network."

The Suggestor queries the network application for answers to the questions in its knowledge module. These answers are added to the list of starting facts. The network application performs tests on the network and returns the answers as follows: 1) yes, 2) yes, and 3) no.

The inference engine applies the list of starting facts to the rules in the network application's knowledge module as follows. Rule 1: The network is functioning properly; therefore, go to rule 2. Rule 2: Computer A is communicating with the network; therefore, go to rule 3. Rule 3: Computer B is not communicating with the network; therefore, report to the user that "Computer B is not properly connected to the network."

The quoted message statements in the rules of this example are replaced with index values to Smart Text in the preferred embodiment of the present invention.

Thus, a method and apparatus for assisting a computer user in solving application and computer system problems has been described.

What is claimed is:

1. An apparatus for assisting a user in solving computer system and application problems in a computer system which is capable of executing a plurality of independent application programs, the apparatus for assisting a user comprising:

a working memory for storing a list of facts about the problem;

a modular knowledge base coupled to said working memory, said modular knowledge base having rules corresponding to meta knowledge, general knowledge, and a current knowledge module, wherein said meta knowledge and said general knowledge being application-independent, said current knowledge module being specific to a current application program selected for execution by the computer system, and said current knowledge module being replaceable by additional knowledge modules from additional ones of said application programs, wherein each of said additional knowledge modules corresponds to one of said additional application programs, wherein said additional application programs are distinct from said apparatus for assisting a user; and an inference engine coupled to said working memory and said modular knowledge base, said inference engine for interpreting the facts in said working memory by applying the facts to said rules corresponding to meta knowledge, general knowledge, or said current knowledge module in said modular knowledge base to produce a valid conclusion about solving the problem, wherein when said inference engine is unable to produce a valid conclusion using said current knowledge module said inference engine selects one of said additional knowledge modules corresponding to one of said additional application programs and replaces said current knowledge module with said selected additional knowledge module such that said selected additional knowledge module becomes said current knowledge module.

2. The apparatus of claim 1 wherein when said inference engine cannot produce a valid conclusion using the current knowledge module said inference engine repeatedly selects and replaces said current knowledge module with said additional knowledge modules to further interpret the facts until the valid conclusion is produced.

3. The apparatus of claim 2 wherein when said selected knowledge module becomes said current knowledge module, said inference engine receives additional facts from said application program corresponding to said selected knowledge module.

4. The apparatus of claim 1, further comprising:

a knowledge acquisition module coupled to said modular knowledge base, said knowledge acquisition module for querying the user for the rules, relationships between the rules, and starting information, and checking the logical correctness of the rules and relationships to assist the user in creating a new knowledge module for a new application program.

5. The apparatus of claim 4, further comprising:

a learning module coupled to said modular knowledge base and said inference engine, said learning module for keeping a log of information including the facts and corresponding results and valid conclusions reached by said inference engine, said inference engine for using the log to reach the valid conclusion about the problem.

6. The apparatus of claim 5 further comprising:

a hypertext module coupled to said modular knowledge base and said inference engine, said hypertext module for storing on-line documentation associated with the current application program, the valid conclusion for indexing said hypertext module to identify on-line documentation relevant to the problem.

7. The apparatus of claim 6 wherein said hypertext module stores text, graphics, and multimedia information associated with said current and additional application programs and the valid conclusion indexes said hypertext module to identify text graphics, and multimedia information relevant to the problem.

8. The apparatus of claim 7, further comprising:

a user interface coupled to said inference engine and said hypertext module, said user interface for allowing the user to interact with the operation of said apparatus for assisting a user, said user interface also for allowing the user to determine the list of facts stored in said working memory.

9. The apparatus of claim 8 wherein said inference engine operates in cycles and analyzes information by forward reasoning.

10. The apparatus of claim 1 wherein said working memory receives the facts from said current application program.

11. In a computer system having the ability to execute a plurality of independent application programs, a method for interpreting data from one or more of the computer application programs and from previous test results stored in a learning module to assist a user in solving a computer system and application problem, the method comprising the computer implemented steps of:

storing meta knowledge and general knowledge in a knowledge base, said meta knowledge being rules of logic, said general knowledge being application-independent rules;

loading a first knowledge module into the knowledge base, said first knowledge module being specific to a first application program;

receiving a list of facts about the problem;

comparing a list of facts to the meta knowledge, general knowledge, or first knowledge module rules in the knowledge base, wherein said comparing the list of facts produces additional facts by application of the facts to the meta knowledge, general knowledge, or first knowledge module rules in the knowledge base, said comparing the list of facts being repeated until either a valid conclusion is reached or no additional facts are produced;

determining whether the learning module stores previous test results that are relevant to solving the problem;

comparing the previous test results that are relevant to solving the problem to the meta knowledge, general knowledge, or first knowledge module rules in the knowledge base, wherein said comparing the previous test results produces additional facts by application of the previous test results to the meta knowledge, general knowledge, or first knowledge module rules in the knowledge base, said comparing the previous test results being repeated until either a valid conclusion is reached or no additional facts are produced; and selecting a second knowledge module which provides additional information about solving the problem, wherein said second knowledge module being specific to a second application program, the first and second application programs being independent;

wherein said comparing the list of facts, comparing the previous test results, and selecting a second knowledge module being performed by an inference engine, wherein said inference engine interprets the list of facts by applying the list of facts to the meta knowledge, general knowledge, or second knowledge module rules in the knowledge base to solve the problem.

12. The method of claim 11, further comprising the step of:

replacing said first knowledge module with the second knowledge module when said comparing the list of facts does not result in a valid conclusion; and repeating said comparing the list of facts and comparing the previous test results until either a valid conclusion is reached or no additional facts are produced.

13. The method of claim 12, further comprising the steps of:

accessing on-line documentation; and indexing said on-line documentation corresponding to the valid conclusion.

* * * * *